April 18, 1939.    A. ZISKA    2,155,073
SPRING
Filed Dec. 16, 1936    2 Sheets-Sheet 1
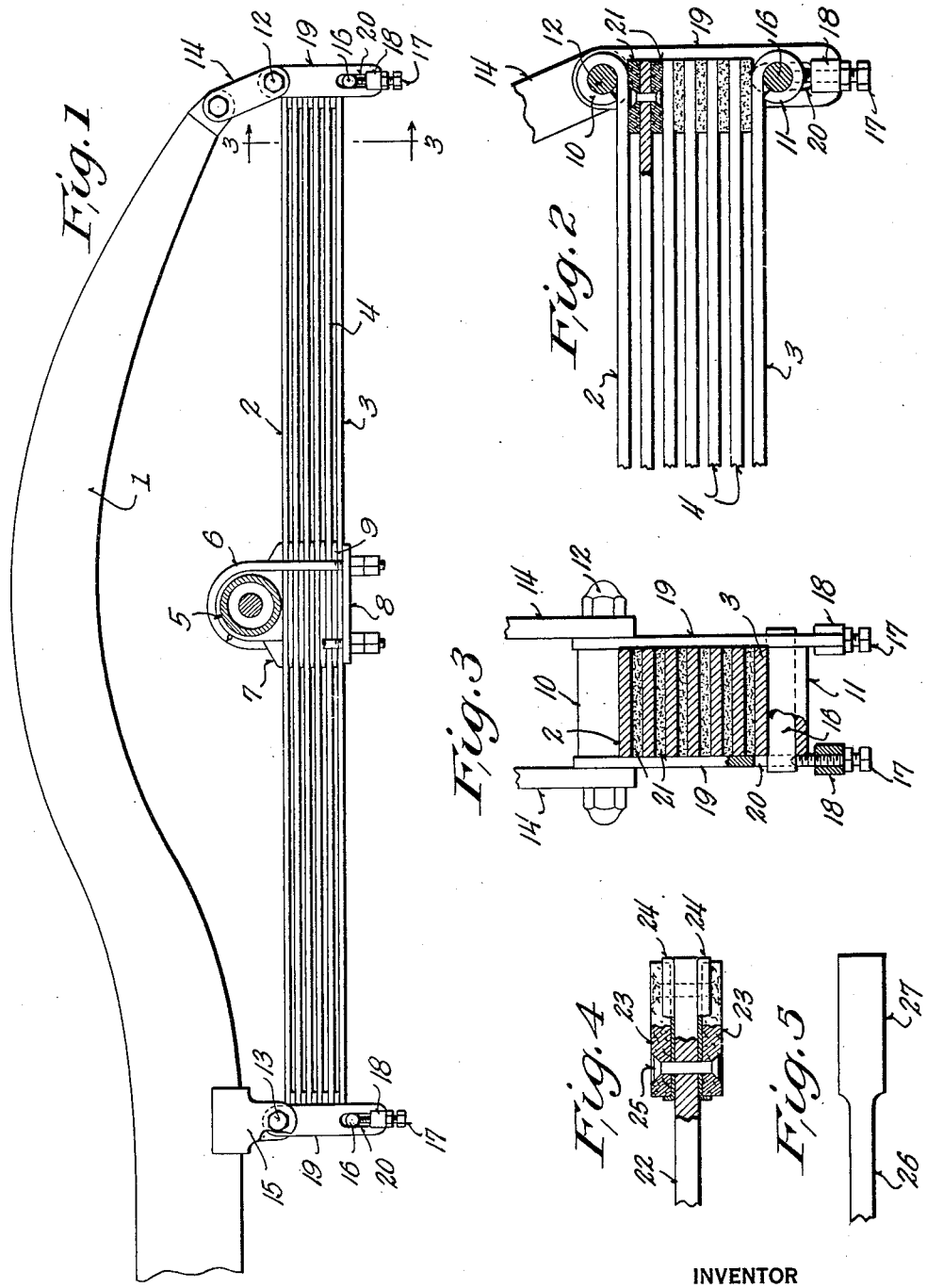
INVENTOR
ADAM ZISKA
BY
Arthur R. Woolfolk
ATTORNEY April 18, 1939.    A. ZISKA    2,155,073
SPRING
Filed Dec. 16, 1936    2 Sheets-Sheet 2
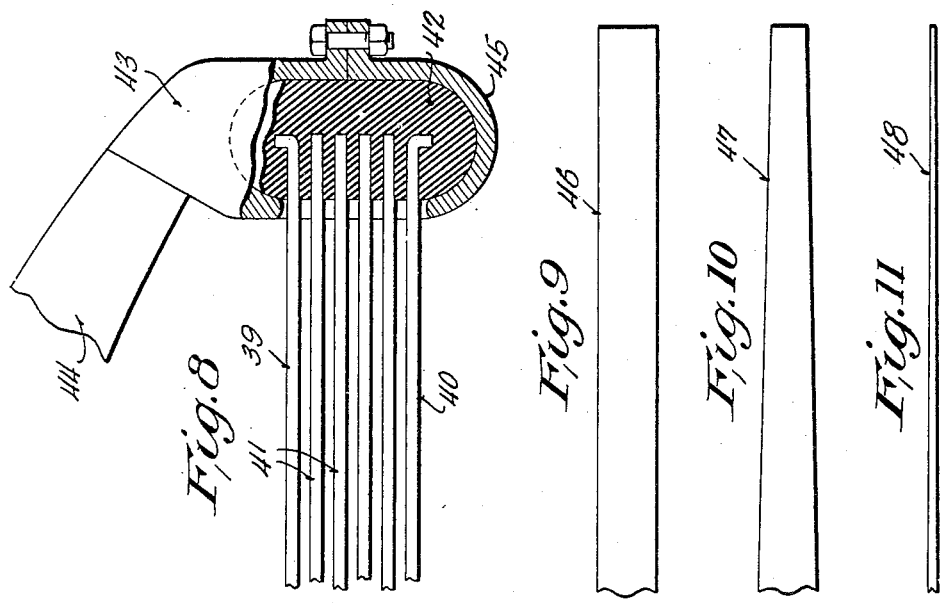
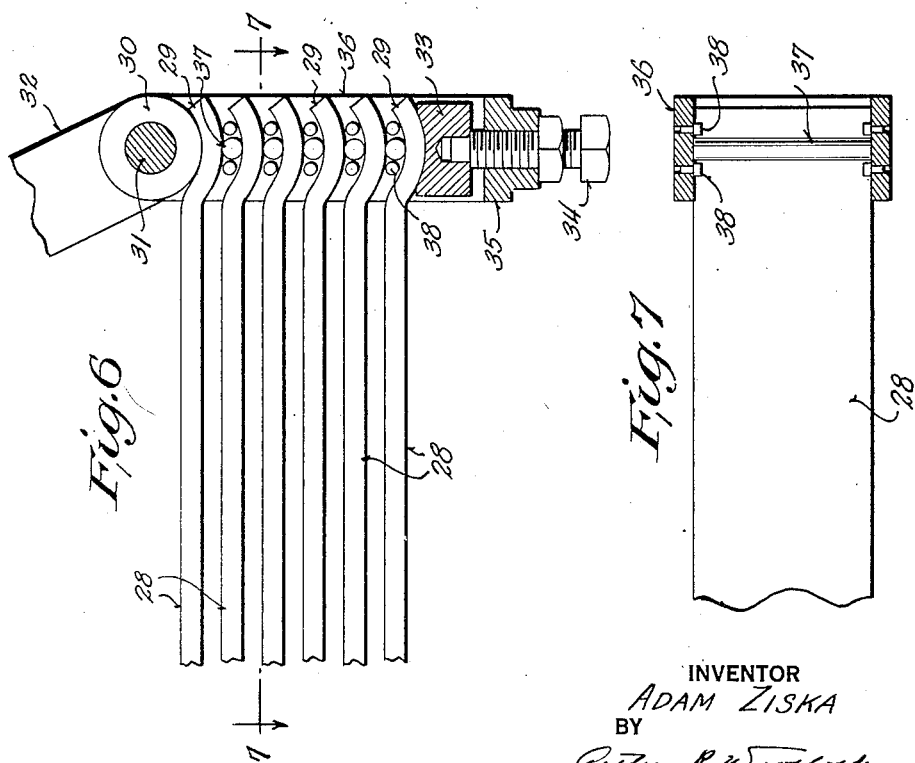
INVENTOR
ADAM ZISKA
BY
ATTORNEY Patented Apr. 18, 1939

2,155,073

UNITED STATES PATENT OFFICE 2,155,073

SPRING

Adam Ziska, Wauwatosa, Wis.

Application December 16, 1936, Serial No. 116,046

2 Claims. (Cl. 267—47)

This invention relates to springs and is particularly directed to springs for automotive vehicles.

The usual type of spring for automotive vehicles employs a plurality of leaves in contact with each other and of successively shorter length. One leaf of the spring runs the entire length and is usually connected by shackle bolts or similar means to the load. When a load is imposed on springs of this type deflection occurs and relative sliding of the face of one spring upon the face of another spring occurs with consequent wear and friction and usually produces squeaking. It is difficult to keep these surfaces oiled and grit and dust will eventually work in between these surfaces and cause considerable wear.

When the automobile encounters a bump in the road, the springs are suddenly deflected but there is in effect a force opposing the cushioning by the spring and this force is not due to the resiliency of the spring itself but is due to the friction between successive leaves of the spring and therefore a stiffer spring and a harder riding car results. On the rebound, however, the leaves tend to separate and an excessive amount of rebound occurs. The load imposed on the spring due to rebound is not equally distributed between the leaves but is transmitted wholly to the successive leaves from the outer ends of the main leaf or longest leaf. Consequently there is considerable tendency to break these leaves due to rebound.

Attempts to overcome this effect have been made by providing straps to tie the ends of every other leaf to the main body of leaves but obviously it is impossible to have these leaves tied together in any manner to provide adequate and uniform loading of all leaves without causing considerable friction under all conditions between the leaves. In effect, it amounts to a practical loading of a single leaf considerably heavier than the other leaves on rebound with consequent tendency to break. The upward rebound of the car after it passes the normal point is not opposed by all of the leaves and consequently the leaves open up and thus allow the main leaf to carry the major part of the load due to rebound.

Additionally this constant opening and closing of the leaves increases the liability of the grit and dirt entering between successive leaves.

It is usual to bow the shorter leaf to a greater extent than the successive leaf. The consequence of this is that there is relatively great pressure per square inch contact surface from leaf to leaf and this is increased as the load is applied. Additionally, under these conditions the shorter leaves are excessively loaded, even under normal conditions, so that when the spring is suddenly deflected these is a tendency to break the shorter leaves.

When the car sways sidewise or a motion tending to twist the spring occurs, this twist is borne by a single leaf, namely, the main leaf, and is not transmitted to successive leaves.

In addition to this, where a Hotchkiss drive is employed, that is to say, where there is no torque arm or torque tube to transmit the twisting force from the rear axle to the frame of the car, but where this force is transmitted directly through the rear springs, it is obvious that when the power is suddenly imparted by the engine to the rear wheels that there is a tendency to lift the forward end of the rear springs and depress the rear ends thereof, as the twist of the rear axle is in the contrary direction to the direction of rotation of the rear wheels. It is obvious, therefore, that one end, in the instance chosen the rear end of the rear springs, is forced downwardly whereas the forward end is lifted up. Thus the rear end of the spring resists this distortion solely by the main leaf of the spring and the successive leaves tend to open up.

This invention is designed to overcome the above noted defects, and objects of this invention are to provide a novel form of spring, particularly for automotive vehicles, which is so made that each leaf of the spring is substantially equally loaded and in which there is no leaf which is excessively loaded, and to provide a construction in which all of the springs are active in rebound and carry their substantially equal share of the load due to rebound.

Further objects are to provide a construction of spring in which each leaf extends substantially the full length of the spring, in which provision is made for the relative automatic shifting or adjustment of the successive leaves under deflection due either to the down or upward motion of the car without having the face of one spring rub against the face of the other spring, to thereby insure a velvety and smooth operation, avoid squeaking, and avoid wear, and also avoid the stiffness due to the frictional retardation offered by the usual type of spring as hereinabove described.

Further objects are to provide a novel form of spring which has very great sidewise stability, which will resist twisting due to the swaying of the car or other motions thereof with each leaf of the spring active in resisting such twisting motion, in which the spring is so constructed that when a Hotchkiss or similar drive is employed each leaf is substantially equally loaded due to the tractive effort of the driving mechanism or due to the action of the brakes, in which the leaves are maintained substantially out of contact with each other for practically their entire length except at their center and ends so that there is no contact and rubbing between successive faces, and in which the leaves may, if desired, be of the same width for successive portions throughout the length of the spring, in which the leaves may be made either of uniform width throughout or may be tapered towards their outer end and may be tapered in thickness also as their outer ends are approached, any one of these types of leaves being suitable for use in the spring.

Further objects are to provide a construction in which provision is made for taking up wear, and in which provision is made for allowing the extreme ends of the springs to freely adjust themselves as the spring is deflected.

Further objects are to provide a novel form of spring which may be constructed in a practical manner, which may be cheaply manufactured, and which will provide a construction having at one and the same time a velvety riding action and a cushioning effect, in which all of the leaves of the spring are active upon rebound.

Embodiments of the invention are shown in the accompanying drawings, in which:

Figure 1 is a fragmentary view showing the spring in position on the frame of an automobile with parts broken away and with parts in section.

Figure 2 is an enlarged view of one end of the spring with parts in section and with one of the leaves of the spring broken away.

Figure 3 is an enlarged sectional view, partly broken away, on the line 3—3 of Figure 1.

Figure 4 is a detail of a modified form of spring.

Figure 5 is a detail of a further modified form of spring.

Figure 6 is a view showing a further form that the invention may take.

Figure 7 is a sectional view on the line 7—7 of Figure 6.

Figure 8 is a view of a still further form of invention.

Figures 9, 10 and 11 are views of different forms of the spring leaves.

Referring to the drawings, particularly Figures 1, 2 and 3, it will be seen that the side frame bar 1 of an automobile has been shown and one of the springs is shown in place as it appears when loaded. Obviously there are four of these springs customarily employed in an automobile.

The spring comprises an upper leaf 2 and a lower leaf 3 and a plurality of intermediate leaves 4. These leaves are locked to the rear axle 5 in any suitable manner, as by means of the U-bolts 6, the upper block or casting 7 and the lower plate 8. Between the members 7 and 8 the springs are clamped and are spaced by means of a plurality of spacers 9 which may be plates and which preferably have somewhat rounded ends, as indicated in Figure 1.

Figure 2 shows how the outer ends of the spring leaves are formed. Referring to such figure, it will be seen that the upper and the lower leaf 2 and 3 are provided respectively with eyelets 10 and 11. If desired, these eyelets may be bushed, though for the sake of clearness the bushings have been omitted.

The upper eyelet is connected to the side frame bar of the automobile. For example, the shackle bolts or pins 12 and 13 may be carried by a pair of links 14 or by a bifurcated fitting 15 secured to the side frame bar 1, see Figure 1. The eyelet 11 of the lower leaf 3 receives the shackle bolt or pin 16 and this pin is held in place by adjustable means to compensate for or take up for wear. For instance, as shown most clearly in Figures 2 and 3, bolts 17 are threaded through enlarged bosses 18 formed in the side links 19 and preferably have pointed ends which seat within indentations formed in the pins 16, relatively short slots 20 being provided in the links 19 to accommodate slight motion of the pins 16, as they are adjusted for wear. It is also preferable to provide lock nuts for the bolts as indicated.

Spacing members are provided between successive leaves of the spring. For example, as shown in Figure 2, every other intermediate leaf 4 is provided with a pair of spacing blocks 21 which are secured in any suitable manner, as by means of a rivet as indicated in Figure 2. These spacing blocks may be formed of any suitable wear-resisting material, for example impregnated brake lining or similar material could be employed. It is preferable to provide a material that has relatively long life and which may, if desired, carry a lubricant.

The leaves of the spring are thus spaced apart throughout their major extent and are clamped in spaced relation adjacent their central portions and are held in spaced relation at their outer ends so that the intermediate portion of the leaves are out of contact with each other.

There is consequently no frictional resistance between these intermediate portions and consequently there is no retardation to the free unhampered action of the spring, the spring effect itself being produced whenever there is a downward motion of the automobile without the usual frictional resistance offered by the sliding of the faces of all of the leaves upon each other, as has heretofore been the usual custom with automotive vehicle springs.

A very decided advantage also lies in the fact that each of the springs takes its full share of the load, both on the downward motion and on the upward recoil; the upward recoil is resisted by each leaf of the springs and there is no opening up between successive leaves, as has heretofore been the result of upward recoil with the usual types of automobile springs. Additionally, this spring, as distinguished from prior types of springs, is so constructed that the load is imposed on each of the leaves adjacent their ends at the full length of the entire spring.

Further than this when the automobile body recoils upwardly, it is apparent that each leaf of the spring resists such recoil action, whereas heretofore only the top or outer leaf resisted this action. There is, therefore, the obvious result that there is very little chance of breaking the spring either on downward motion or upward recoil.

A free floating action is afforded by this spring as the extensive faces of the several leaves are out of contact with each other. A free, velvety riding action, therefore, results when this spring is employed and an active cushioning of upward recoil also is obtained.

By having the ends of the successive leaves relatively free, it is apparent that the slight adjustment necessitated by the deflection of the spring is provided for. If, on the other hand, these outer ends were rigidly clamped as well as the central portion of the spring, a rigid, relatively unyielding structure would result.

It is apparent that it is not necessary to house these springs for even if grit or dust collects between the leaves, no harm will be done as the leaves are out of contact with each other.

The leaves may be perfectly straight when unloaded or may be slightly arched upwardly so that when they are loaded, they will take the form shown in Figure 1 for instance.

It is obvious that various modifications may be made without departing from the spirit of this invention. For example, in the form shown in Figure 4 the intermediate leaves which carry spacing members may be constructed as shown in such figure. This intermediate leaf 22 may have the spacing members 23 carried within small, relatively shallow pan like members or containers 24 which prevent spreading of such members 23. Rivets 25 may be employed, as previously described, and may fit snugly within apertures formed in the bases of the retaining pans 24.

Again the intermediate leaves may either be alternately or else all formed with enlarged ends. For example as shown in Figure 5, an intermediate leaf 26 is shown with an enlarged end 27.

Referring to the form shown in Figure 6, it will be seen that each of the leaves 28 are provided with rounded or curved ends 29. The uppermost end can bear against a spacer 30 carried on the shackle bolt 31 from the links 32 and the rounded portion 29 of the lowermost of the leaves can be socketed or bear against an adjustable block 33 carried by the shouldered end of the adjusting bolt 34, a suitable lock nut being provided for such bolt, the bolt being threaded through the yoke portion 35 which may be formed integral with the links 36. Small rollers 37 may be positioned between successive curved portions 29 and if desired any suitable means, such for example as the short pins 38, may be carried by the side links, see particularly Figure 7, to provide limited though appreciable motion for the rollers 37.

The invention may take other forms. For example as shown in Figure 8, the ends of the upper and lower springs 39 and 40 and the intermediate springs 41 may be received in molded live rubber 42, the ends of the outermost springs 39 and 40 being preferably outwardly turned as shown. This live rubber may be carried in a suitable bracket or member 43 welded or otherwise secured to the side frame bar 44 and provided, if desired, with a removable bottom or cup member 45. Other suitable constructions could be employed.

In each form of the invention a slight motion of the ends of the springs is allowed for, though means are provided for preventing rattling where wear would occur and yet insuring free, relative motion for the ends of the leaves of the springs.

Obviously the leaves of the springs can take different shapes. As shown in Figure 9, the leaf 46 may be a flat rectangular leaf.

In the form shown in Figure 10 the leaf 47 is shown tapered horizontally, whereas in the form shown in Figure 11 the leaf 48 may be tapered in thickness or vertically. Obviously this vertical tapering could be combined with either the form shown in Figure 9 or Figure 10. The purpose of this tapering is so that the central portions of the leaves will be stronger than the end portions as the bending moment is greatest towards the center.

It will be seen that these springs do not have to be either housed nor do they have to be oiled. They will be freely flexible and velvety in their action and afford the maximum in riding characteristics for automotive vehicles. Additionally, each leaf is equally loaded with every other leaf and each leaf comes into action not only on the downward motion of the automobile body but also on the upward or recoil motion thereof.

Further it is clear that when a Hotchkiss type of drive is employed, that the rear axle tends to rotate the spring in the reverse direction from the direction of rotation of the rear wheels. Consequently one end of the spring is forced downwardly and the other one upwardly. Under these conditions with the present invention every leaf of the spring bears its equal share of this stress and there is thus considerably greater safety with this type of spring and less breakage can occur than with the usual types.

Additionally it is to be noted that the relative spacing of the upper and lower leaves of the spring and of the successive leaves provides considerable strength against torsional stresses tending to twist the spring, as for instance when the car body sways from side to side.

It will be seen further that the device can be readily made and may be cheaply constructed. Means are provided for taking up wear and also it is clear that the springs may be applied to existing types of automotive vehicles without any modification in their design.

Although this invention has been described in considerable detail, it is to be understood that such description is intended as illustrative rather than limiting, as the invention may be variously embodied and is to be interpreted as claimed.

I claim:

1. A spring for an automotive vehicle comprising a plurality of leaves arranged in spaced relation, load applying means intermediate the ends of said spring having spacers between said leaves, load applying means adjacent the ends of said spring and including pairs of shackle bolts, said spring including a pair of outer leaves having eyelets formed therein surrounding said shackle bolts and at least one intermediate leaf, spacing means adjacent the ends of said leaves arranged between successive leaves, links at each end of the spring pivotally mounted on one shackle bolt and carrying the other shackle bolt of each respective pair, one of said shackle bolts of each pair being adjustable longitudinally of the respective links, and screw means for adjusting the adjustable shackle bolts.

2. A spring comprising a plurality of leaves arranged in spaced relation and including two outer leaves and at least one intermediate leaf, spaced loading means, one of said loading means being located adjacent the ends of said leaves and including a pair of transversely extending bolt like members and links joining said bolt like members, said outer leaves having eyelets enclosing said bolt like members, wear resisting means carried by said intermediate leaf at the end of said intermediate leaf, and adjusting means for moving one of said bolt like members towards the other bolt like member to take up wear and to normally hold the assembly consisting of the wear resisting means and the spring ends in close contact on both upward and downward motion, the ends of said leaves having relative sliding motion with respect to each other.

ADAM ZISKA.